Oct. 23, 1945.  E. H. SMITH  2,387,360
CLOSURE FOR PRESSURE VESSELS
Filed Aug. 20, 1942  3 Sheets-Sheet 1
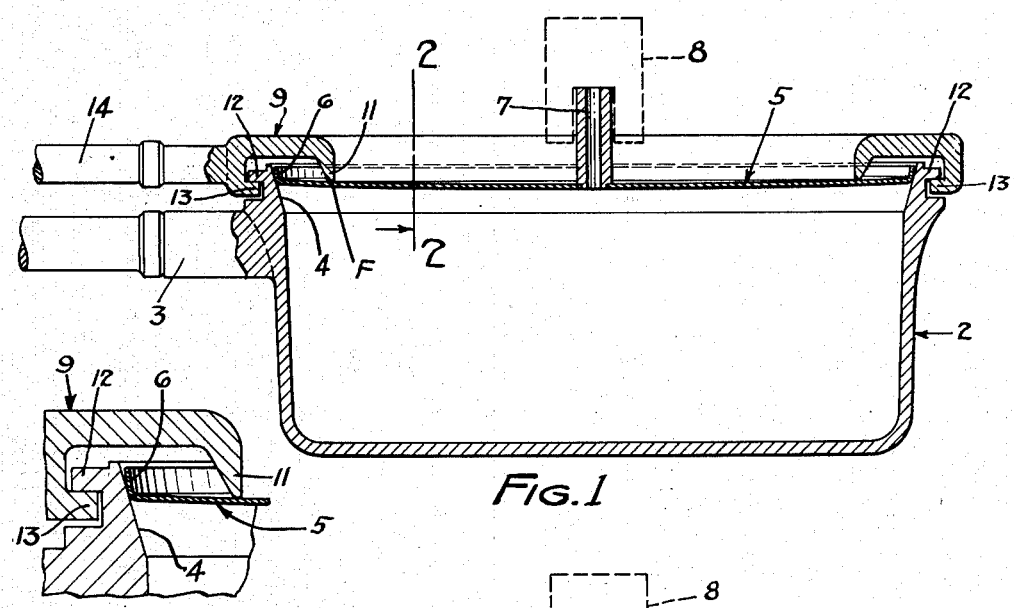
Fig.1
Fig.2
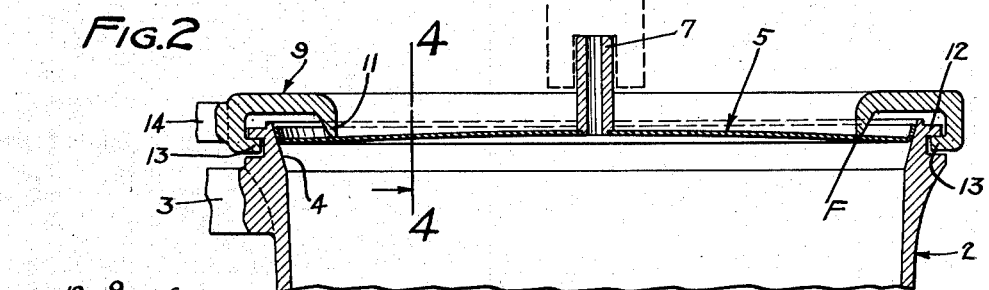
Fig.3
Fig.4
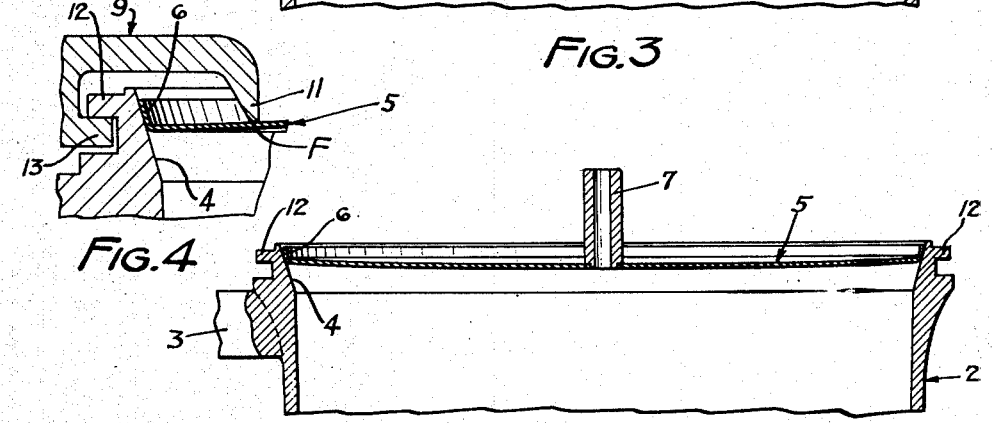
Fig.5
INVENTOR
ELMER H. SMITH
By Paul, Paul & Moore
ATTORNEYS Oct. 23, 1945.   E. H. SMITH   2,387,360
CLOSURE FOR PRESSURE VESSELS
Filed Aug. 20, 1942   3 Sheets-Sheet 2

INVENTOR
ELMER H. SMITH
By Paul, Paul & Moore
ATTORNEYS

Oct. 23, 1945.  E. H. SMITH  2,387,360
CLOSURE FOR PRESSURE VESSELS
Filed Aug. 20, 1942  3 Sheets-Sheet 3

INVENTOR
ELMER H. SMITH
By Paul, Paul & Moore
ATTORNEYS

Patented Oct. 23, 1945

2,387,360

UNITED STATES PATENT OFFICE 2,387,360

CLOSURE FOR PRESSURE VESSELS

Elmer H. Smith, Minneapolis, Minn.

Application August 20, 1942, Serial No. 455,529

6 Claims. (Cl. 220—40)

This invention relates to new and useful improvements in pressure vessels or containers, and more particularly to a novel closure for such vessels.

Pressure vessels, particularly of the type commonly known as pressure cookers, have heretofore been provided with numerous types of closures embodying various forms of mechanisms for securing them in seal-tight relation to their respective cooker bodies. Some closures have been designed to provide a metal-to-metal contact between the closure and its seat, but such closures have, in the past, been secured to the cooker bodies by clamping screws or elements, or other mechanical devices which may be operated to force the closures into seal-tight engagement with the seats in the cooker bodies.

Other closures have necessitated the use of a flexible gasket or sealing element of some sort between the closure and cooker body to provide a seal-tight connection therebetween. Such closures have in recent years become quite popular, particularly with the domestic trade, but have not proven entirely satisfactory for sanitary reasons. The flexible sealing gaskets of such cookers are usually supported in an annular groove, and such grooves have a tendency to collect foreign matter and food particles, which eventually may contaminate the contents of the cooker. While the gaskets in such cookers may, of course, be removed for cleaning, such practice is not commonly carried out, because it is not always an easy matter to remove such a gasket and re-insert it in the groove and, as a result, cleaning of the groove and gasket is therefore usually neglected.

Other cookers have been provided with an inwardly extending annular flange having a seat on its downwardly facing side adapted to be engaged by a cover which, in order to be seated against said downwardly facing seat, has made it necessary to fold or distort the cover more or less upon itself to allow it to be inserted through the opening in the cooker body, after which the cover is allowed to resume its normal shape and is then moved into engagement with the seat. In closures of this type it is necessary to bend or partially fold the cover upon itself in order that it may be inserted through the open top of the cooker, the diameter of which must obviously be smaller than the diameter of the closure in order that the closure may seat against the underside of the cooker body flange.

Closures for pressure cookers and other pressure vessels which are used quite frequently, should preferably be so designed as to require very little effort and time on the part of the operator, in the operation of securing the closure in leak-tight relation to the cooker body, or removing it therefrom, and it is a feature of the present invention to provide a closure of the type described, in which all of the objectional features now present in closures of this general type have been substantially entirely eliminated.

After considerable experimental work with closures of various types, I conceived the idea of using a thin flexible sheet metal cover having a diameter substantially equal to the diameter of the open top of the cooker body, and securing it to a seat in the cooker body by a suitable cover-retaining member adapted to annularly engage the cover adjacent to its outer marginal edge, and serving as a fulcrum for the closure, when forcing the closure into sealing engagement with the seat in the cooker body.

An object of the present invention, therefore, is to provide a closure for pressure cookers and the like, which closure is constructed of flexible sheet material as, for example, metal, having its outer marginal edge portion adapted to engage an annular seat in the cooker body, and means being provided for securing the closure to the cooker body in such a manner that when pressure is exerted against the closure from within the cooker body, the marginal edge portion thereof is forced into sealing engagement with the cooker body.

A further object of the invention is to provide a flexible metal closure or cover for pressure cookers, having its marginal edge portion adapted to engage a seat in the cooker body, and a suitable retaining member being detachably secured to the cooker body and having a portion adapted to annularly engage the cover adjacent to the outer marginal edge portion of the cover, in such a manner that the major central portion of the cover is unsupported by said member and may flex upwardly or outwardly, when pressure develops within the cooker body, said clamping member serving as an annular fulcrum for the cover whereby when the central portion of the cover is upwardly flexed by internal pressure in the cooker, the marginal edge portion of the cover is forced into sealing engagement with its seat in the cooker body.

A further object of the invention resides in the provision of a unique closure for pressure cookers, comprising a thin, flexible disk-like body, preferably of sheet metal, having an outer annular flange adapted to engage a seat in the cooker body, and so secured to said seat that as the pressure within the cooker body increases, the pressure exerted on the cover flange to secure it to said seat will be correspondingly increased.

Other objects of the invention reside in the unique and simple construction of the apparatus as a whole; in the provision of a pressure cooker closure comprising a flexible disk and a cover-retaining member having an annular portion adapted to engage the upper surface of the closure in a manner to provide an annular fulcrum for the cover; in the provision of a closure for a pressure cooker and the like, having its marginal edge portion adapted to engage a seat in the cooker body, and comprising an annular cover-retaining member having an annular flange adapted to engage the top of the flexible closure adjacent to the annular seat in the cooker body, but in a circular line spaced inwardly from said seat, whereby when the cover is placed upon the cooker body, and pressure develops within the cooker, the central unsupported portion of the closure will flex upwardly, and thereby cause the marginal edge portion of the cover to be forced downwardly into sealing engagement with the seat.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a sectional elevational view showing my improved closure applied to a pressure cooker;

Figure 2 is an enlarged detail sectional view on the line 2—2 of Figure 1, to more clearly illustrate the initial sealing engagement of the closure with the cooker body;

Figure 3 is a view corresponding to Figure 1, but showing the closure distorted or outwardly flexed as a result of pressure in the cooker body;

Figure 4 is an enlarged detail sectional view on the line 4—4 of Figure 3, showing the closure in complete sealing engagement with the seat in the cooker body;

Figure 5 is a detail sectional view of the upper portion of a cooker body with the closure fitted loosely on its seat;

Figure 6:
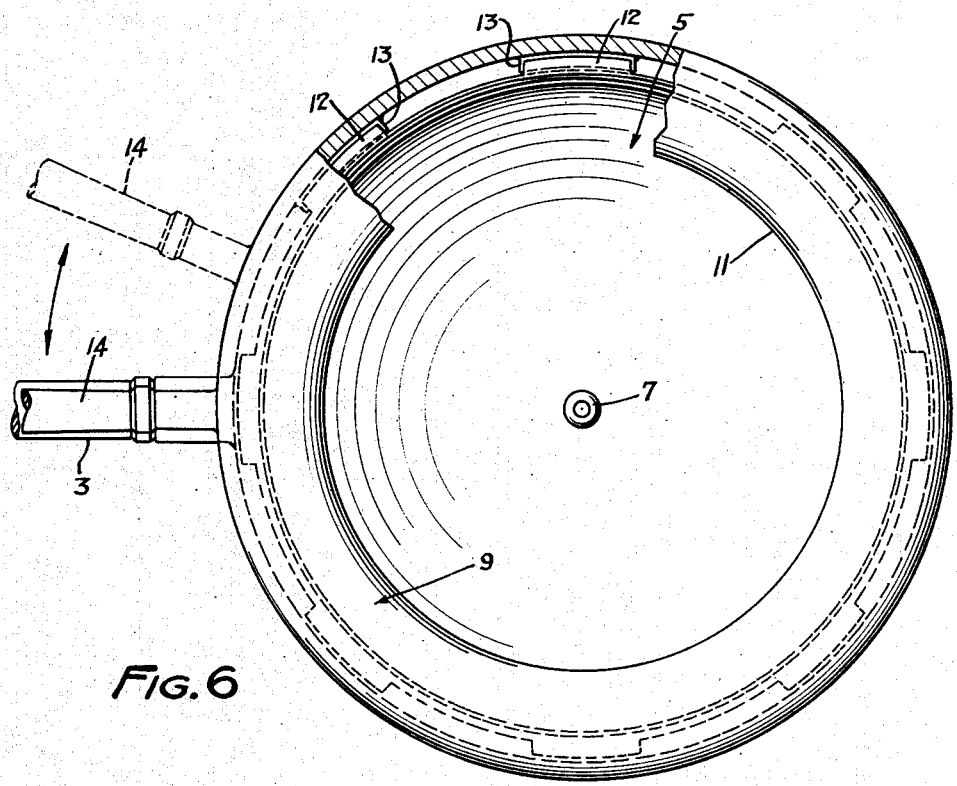
Figure 6 is a plan view of Figure 1, showing the interlocking means between the cooker body and cover-retaining member.

In the selected embodiment of the invention herein disclosed, there is illustrated in Figure 1, for purposes of disclosure, a pressure vessel or cooker comprising a body 2 shown provided with an outwardly extending handle 3. The upper portion of the body 2 is shown formed with a tapered seat 4 for receiving a suitable cover, generally designated by the numeral 5.

An important feature of the present invention resides in the novel construction of the cover 5. As illustrated in the drawings, the body of the cover is constructed of flexible sheet material, preferably metal. In the form shown in Figures 1 to 5, inclusive, the body of the cover is shown slightly concaved, when in its normal state, best shown in Figure 5. The cover has an upwardly turned marginal flange 6 adapted to engage the seat 4 of the cooker body, when the cover is positioned on the cooker as shown in Figure 5. The cover may be provided with a suitable upstanding tubular post or element 7 adapted to receive a suitable pressure gauge 8, indicated in dotted lines in Figures 1 and 3.

To retain the cover 5 in sealing engagement with the seat 4, there is provided a suitable cover-retaining member, generally designated by the numeral 9. This member is preferably in the form of an annulus, and has a downwardly extending portion 11, preferably in the form of an annular flange, adapted to annularly engage the upper surface of the cover 5 adjacent to the seat 4, but spaced inwardly therefrom, as clearly illustrated in the drawings, whereby the major central portion of the cover is unsupported by the flange 11 and may flex upwardly by internal pressure in the cooker body, as will subsequently be described. The flange 11 annularly engages the cover and provides what may be termed an annular fulcrum, designated by the reference character F, about which the outer marginal portion of the cover may pivot, when pressure develops within the cooker body.

Means is provided for detachably securing the cover-retaining member 9 to the cooker body and, in the present instance, is shown comprising a plurality of outwardly extending or radially disposed lugs 12, preferably formed integral with the upper portion of the cooker body, as will be understood by reference to the drawings. The lugs 12 are spaced apart around the circumference of the cooker body and are adapted to be engaged by inwardly projecting lugs 13, provided on the cover-retaining member 9. The spacing between the lugs 12 of the cooker body is such as to permit free passage therebetween of the lugs 13 on the cover-retaining member 9. The cover-retaining member 9 is shown provided with a suitable handle 14 whereby said member may conveniently be rotated on the cooker body to secure it to said body or remove it therefrom. The co-acting lugs 12 and 13 are preferably so arranged with respect to the handle 3 on the cooker body that when the cover-retaining member is in its operative position, shown in full lines in Figures 1 and 6, the two handles 3 and 14 are disposed in substantially a vertical plane.

Another feature of the invention resides in making the body of the cover 5 of flexible material, and so supporting it on the cooker body, that when pressure develops within the cooker body, the cover is forced tightly into leakproof relation with its seat by the internal pressure in the cooker. By reference to Figures 2 and 5, it will be noted that when the cover is in its normal state, and is initially placed on the seat 4 of the cooker body, the upper portion of the cover flange 6 may not engage the seat 4 because of the dish-shaped or concaved condition of the cover 5 when in its normal state.

After placing the cover on the seat 4, the cover-retaining member 9 is placed on the cooker body and secured thereto by swinging the handle 14 of the member 9 to a position directly over the handle 3 of the cooker body, whereby the lugs 13 of the member 9 will interlock with the lugs 12 of the cooker body and thereby positively secure the member 9 against detachment from the cooker body, so long as the two handles are vertically aligned.

When the annular flange 11 of the cover-retaining member 9 engages the cover 5, it will exert sufficient downward pressure thereon to provide an intial seal between the cover flange 6 and the seat 4, which will prevent leakage from the cooker body, when the pressure initially begins to develop therein.

Because of the enlarged central portion of the cover 5 being supported by the cover-retaining member 9, that portion of the cover which is visible through the opening defined by the annular flange 11 of the member 9, is free to flex upwardly from increasing pressure in the cooker body, thereby causing the cover to "pivot" or fulcrum about the edge of the flange 11 around the circumference of the cover. Such upward flexing of the central portion of the cover will therefore cause the outer marginal edge portion or flange 6 of the cover to be forced downwardly into sealing engagement with the seat 4, as clearly illustrated in Figure 4, thereby positively sealing the joint between the cover flange 6 and the seat 4 of the cooker body, as will readily be understood.

It is important, of course, that the major central portion of the cover defined by the annular flange 11 of the member 9, be so proportioned with respect to the outer marginal edge of the cover which lies between the flange 11 and the seat 4, that the unsupported central portion of the cover will be considerably greater in area, than the outer marginal portion of the cover, whereby the central portion thereof will immediately begin to flex upwardly when pressure is initially started within the cooker body.

The novel cover and cover-retaining member herein disclosed has proven very efficient and practical in operation and provides a leakproof closure for a pressure vessel or cooker with very little effort upon the part of the operator. In other words, the cover and cover-retaining member are so designed and proportioned with respect to the seat 4, that when the cover 5 is initially positioned on the seat 4, as shown in Figure 5, and the member 9 is interlocked with the lugs 12 of the cooker body, the cover-retaining member 9 will but lightly engage the cover, whereby the member 9 may be freely rotated on the cooker body from unlocked to locked position without effort.

The novel cover herein disclosed, is so designed and secured to the cooker body that, in effect, it operates as a sensitive diaphragm, whereby when the slightest pressure initially develops within the cooker body, the entire central portion of the cover will immediately begin to flex upwardly like a diaphragm, and thereby force the cover flange 6 into sealing engagement with the seat 4.

To remove the closure from the cooker body it is necessary that the internal pressure of the cooker be released to the atmosphere before an attempt is made to remove the cover. This may readily be accomplished by manipulation of the usual safety release valve or gauge 8 supported on the stem 7. As soon as the internal pressure of the cooker body has been released, the cover may assume its normal concave position, shown in Figure 5, whereupon it will exert little or no pressure against the cover-retaining member 9, and the latter may then readily be relatively rotated on the cooker body from locked to unlocked position, as indicated in full and dotted lines in Figure 6.

Figure 7:
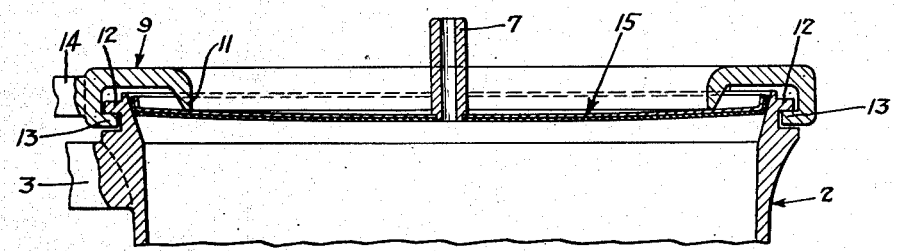
Figure 7 is a detail sectional view of a portion of a cooker, showing a closure made of bi-metal.

In Figure 7 there is shown a cover, generally designated by the numeral 15, which is made of bi-metal whereby it will respond quickly to variations in temperature and pressure within the cooker body. The cover shown in Figure 7 operates in a manner very similar to the one illustrated in Figures 1 to 6, inclusive, except that it will respond to variations in temperature as well as to variations in the pressure within the cooker body.

Figure 8:
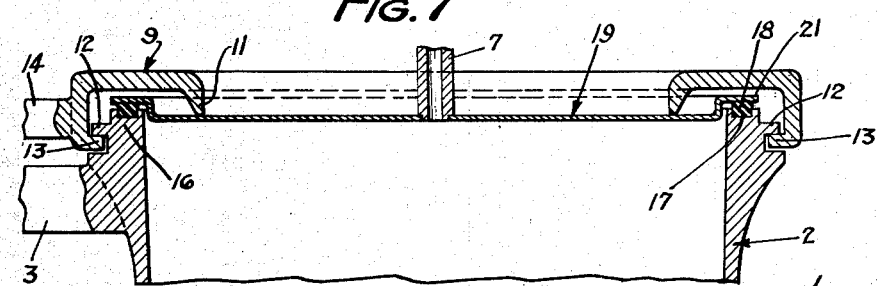
Figure 8 is a detail sectional view showing a closure adapted to engage a suitable gasket interposed between the upper edge of the cooker body and the closure to provide a leak-proof joint therebetween.

Figure 8 illustrates another form in which the upper marginal edge portion 16 of the cooker body 2 is shown provided with an annular groove 17 adapted to receive a suitable sealing element or gasket 8, which may, if desired, be suitably secured in the groove 17 so as to remain fixed on the cooker body.

The closure 19, which may also be slightly downwardly dished in a manner similar to the cover shown in Figure 5, when in its normal cold state, is provided with a marginal flange 21 shown offset from the median plane of the body of the cover and spaced upwardly therefrom. The flange 21 is adapted to be seated upon the gasket 18 as shown. When the cover-retaining member 9 is secured to the cooker body, as hereinbefore described, the depending flange 11 thereof will engage the body of the cover 19 adjacent to the marginal flange 21 and thereby slightly downwardly force the flange 21 of the cover into engagement with the gasket 18. Such slight downward pressure of the flange 21 against the gasket 18 will provide an initial seal for the cover, which will prevent the escape of pressure from within the cooker body when the cooking operation is initially started.

As the pressure begins to develop within the cooker body, such pressure is exerted against the major central unsupported portion of the cover 19, thereby gradually forcing or flexing the central portion of the cover upwardly in a manner similar to that shown in Figure 3, whereby the flange 21 of the cover 19 is forced firmly against the gasket 18 to thereby hermetically seal the cooker.

Figure 9:
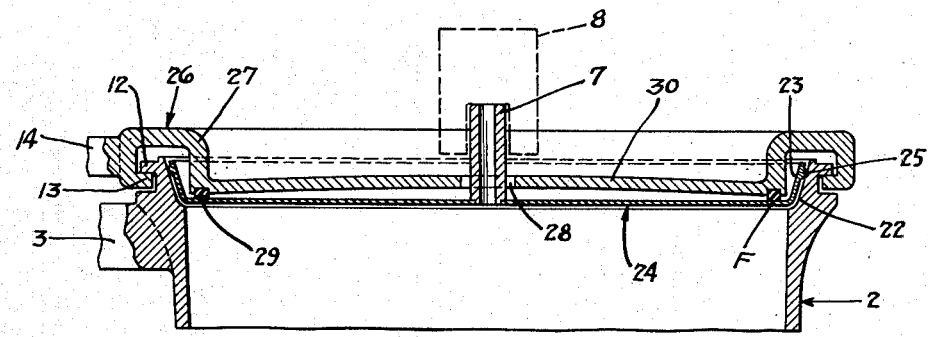
Figure 9 is a detail sectional view showing a closure wherein a cushion element is interposed between the closure and the closure-retaining member to yieldably retain the closure in sealing engagement with the seat in the cooker body.

In Figure 9 there is shown a cooker body 2 provided with a tapered seat 22 adapted to be engaged by an upturned flange 23 on a flexible cover 24. The flange 23 of the cover 24 is shown relatively higher than the marginal flanges of the covers 5 and 15, and preferably has an annular bead 25 adapted to engage the seat 22.

To secure the cover 24 in sealing engagement with the seat 22, there is provided a suitable cover-retaining member, generally designated by the numeral 26, which is adapted for interlocking engagement with the cooker body in a manner similar to the cover-retaining member 9, shown in the previous figures. The member 26 is shown provided with an annulus 27 comprising lugs 13 adapted to interlock with the lugs 12 of the cooker body. The member 26 also has an upper wall portion 30 which is shown provided with a central opening 28 adapted to receive the tubular post or stem 7 upon which the pressure or release gauge 8 may be mounted.

In order that the cover-retaining member 26 may firmly hold the bead 25 of the flange 23 in sealing engagement with the seat 22, the member 26 is adapted to engage the upper surface of the cover 24 adjacent to the flange 23 and preferably around the entire circumference of the cover.

A suitable resilient element 29 is shown interposed between the cover-retaining member 26 and the upper surface of the cover 24 to cushion the engagement of the member 26 with the cover 24. Thus, when the member 26 is moved into locking engagement with the cooker body, as shown in Figure 9, the annular element 29 will exert a yieldable pressure on the cover 24, whereby bead 25 of the flange 23 will sealingly engage the seat 22 and thus prevent escape of pressure from the cooker body during the cooking operation.

As in the previous figures, the major central portion of the cover 24 is adapted to be flexed upwardly by internal pressure in the cooker body, and provision is made for such upward flexing of the cover by upwardly curving the wall 30 of the member 26, as shown in Figure 9. Thus when pressure develops within the cooker body, the central portion of the cover will flex upwardly towards the wall portion 30 of the member 26 and thereby cause the annular gasket or element 29 to function as a fulcrum for the outer portion of the cover, and thereby force the cover bead 25 into sealing engagement with the seat 22.

Figure 10:
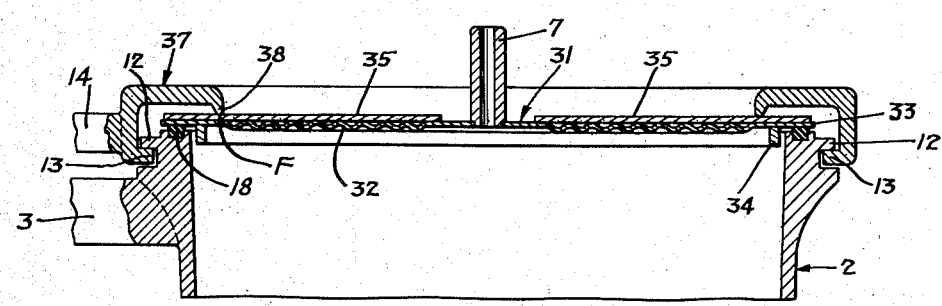
Figure 10 is a view similar to Figure 9, but showing a closure comprising a plurality of closely spaced annular corrugations, and having its outer marginal edge portion arranged to be seated against a gasket supported in the upper edge portion of the cooker body.

In Figure 10 there is shown a cover 31 of slightly different construction, in which the major central portion 32 of the cover is made in the form of an aneroid, that is, it is composed of a plurality of closely spaced annular corrugations which co-act to produce a cover which may freely flex by variations in the pressure within the cooker body. The cover 31 has its outer marginal flange 33 seated upon a gasket 18, similar to the one shown in Figure 8.

An annular depending flange 34 may be provided upon the cover 31 to act as a centering means for accurately positioning the cover 31 upon the sealing element 33.

Figure 11:
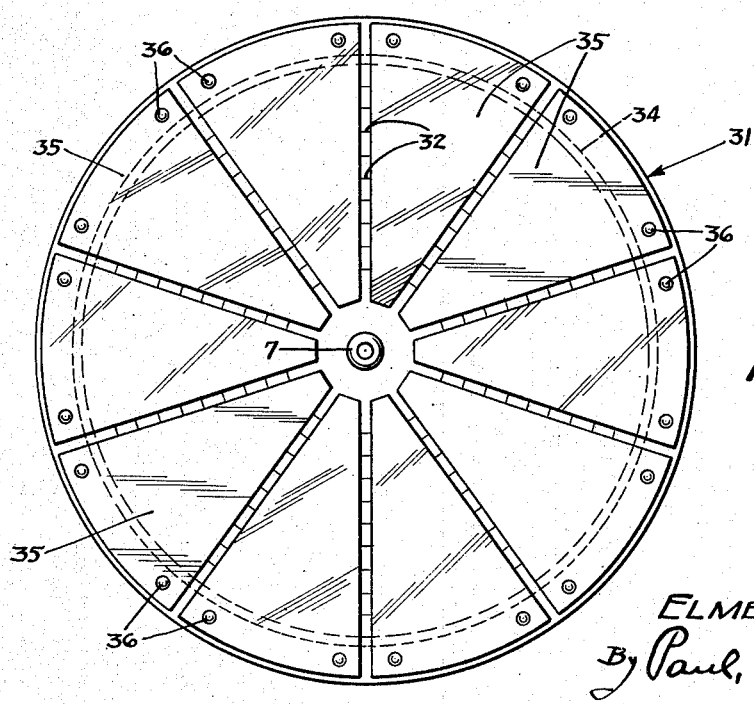
Figure 11 is a plan view of the closure shown in Figure 10.

The cover shown in Figures 10 and 11 preferably comprises a plurality of radially disposed segments 35, having their outer edge portions suitably secured to or riveted to the outer marginal edge portion of the cover 31 by suitable means such as rivets 36, shown in Figure 11. The inner ends of the segments 35 are arranged to overlie the corrugations 32 of the cover 31 and are unsecured thereto. The segments 35 function to provide a support for the corrugated central portion of the cover 31, when the latter is flexed upwardly by internal pressure within the cooker body. A cover-retaining member, generally designated by the numeral 37, is adapted for interlocking engagement with the cooker body 2 to secure the cover 31 to the cooker body, in a manner similar to that shown and described with reference to Figures 1 and 3. The cover-retaining member 37 is shown provided with a depending edge portion or an annular bead 38 adapted to engage the upper outer marginal portions of the segments 35, thereby to hold the cover on its seat, and at the same time, permitting the major central portion of the cover to flex upwardly about the fulcrum F.

From the foregoing it will be noted that the invention herein disclosed is extremely simple and inexpensive, and readily lends itself to manufacture in quantity production at small cost. The design of the cover, per se, and its locking member 9 are such as to provide a perfect seal between a cover and pressure vessel or cooker, when the cover is locked in sealing engagement with its seat.

In the preferred form of the invention, shown in Figures 1 to 6, inclusive, no porous or yieldable gaskets of any sort are employed, thereby making the apparatus extremely sanitary and easy to keep clean.

The simple and inexpensive design of the cover is also of extreme importance, as it greatly simplifies cost of manufacture and provides a simple, smooth, disk-like cover which, when removed from the cooker body, may readily be handled when cleaning, as it is extremely light in weight and free of obstructions. The stem 7 may, if desired, be conveniently utilized as a handle for placing the cover upon the seat 4 of the cooker body, as will be understood by Figure 5, and also whereby the cover may readily be removed from the cooker body.

While I have herein described the invention as applying to a pressure cooker, it is to be understood that it may be applied to various other pressure apparatus or vessels, where practicable, without departing from the scope of the invention.

It will be apparent to those skilled in the art that I have accomplished at least the principal objects of my invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. A pressure vessel comprising a body having an open top provided with an annular tapered seat, a flexible sheet-like cover having an upturned peripheral flange adapted to engage said seat and tapered to conform thereto, and an annular cover-retaining member annularly engaging the outer surface of the cover to provide an annular fulcrum spaced inwardly of the cover flange and at a point distant therefrom to provide a pronounced lever action at the marginal edge portion of said cover as the central portion of said cover is flexed from internal pressure in the vessel, whereby the flanged edge portion of the cover is forced into sealing engagement with the annular tapered seat when pressure develops within the vessel.

2. A pressure cooker comprising a body provided with an upwardly directed annular tapered seat, a flexible cover of sheet metal having an upwardly turned tapered peripheral flange arranged to engage said seat, a cover retaining member overlying the cover and having means adapted for interlocking engagement with means on the cooker body, said retaining member having a depending annular flange adapted to annularly engage the cover to provide an annular fulcrum spaced inwardly of said seat and at a point relatively distant therefrom to provide a pronounced lever action at the peripheral flange portion of said cover as the major unsupported central portion of said cover is flexed outwardly from internal pressure in the vessel, whereby the peripheral flange of the cover is forced into sealing engagement with the seat, when pressure develops within the cooker body.

3. A pressure vessel comprising a body provided at its upper portion with an outwardly facing annular seat, a thin flexible cover having an annular upturned peripheral stiffening flange having its outer peripheral surface conforming to and engaging said annular seat with a sealing fit, and a cover-retaining member secured to said body and serving to hold said flange in seat engaging relation and to prevent displacement thereof due to pressure within the vessel, said cover retaining member annularly engaging the outer face of the cover forming an annular fulcrum spaced inwardly an appreciable distance from said annular seat to provide a pronounced lever action at the flanged edge portion of said cover in a direction toward said seat as the major unsupported central portion of said cover is flexed outwardly due to internal pressure in the vessel, whereby the flanged edge portion of the cover is forced into sealing engagement with the seat when pressure develops within the vessel.

4. A pressure vessel comprising a body provided with an outwardly facing annular seat, a cover having its outer marginal edge portion resting on said seat in non-sealing relation therewith and adapted to be forced into sealing relation with said seat when pressure is generated within the vessel, said seal being made only upon movement of the major portion of said cover in an outward direction, and an integral annular cover retaining member secured to said body and having a downwardly extending annular flange initially lightly engaging the upper face of said cover at points spaced inwardly from the seat to hold said cover in its non-sealing relation with the seat and from disengagement with the body, said cover otherwise free to cooperate with said downwardly extending flange to provide a pronounced lever action at the marginal edge portion of said cover in a direction toward the seat as the major unsupported central portion of said cover is moved outwardly due to internal pressure generated in the vessel, whereby the marginal edge portion of the cover is forced into its sealing engagement with said seat and with varying degrees of sealing as pressure develops within the vessel.

5. A pressure vessel comprising a body provided with an outwardly facing annular seat, a flexible sheet-like cover of bi-metal having its outer marginal edge portion resting on said seat in non-sealing relation therewith and adapted to be forced into sealing relation with said seat when pressure is generated within the vessel, said seal being made only upon movement of the major portion of said cover in an outward direction, and an integral annular cover retaining member secured to said body and having a downwardly extending annular flange initially lightly engaging the upper face of said cover at points spaced inwardly from the seat to hold said cover in its non-sealing relation with the seat and from disengagement with the body, said cover otherwise free to cooperate with said downwardly extending flange to provide a pronounced lever action at the marginal edge portion of said cover in a direction toward the seat as the major unsupported central portion of said cover is moved outwardly due to internal pressure generated in the vessel, whereby the marginal edge portion of the cover is forced into its sealing engagement with said seat and with varying degrees of sealing as pressure develops within the vessel.

6. A pressure vessel comprising a body provided with an outwardly facing annular seat, a cover of sheet metal having its outer marginal edge portion resting on said seat in non-sealing relation therewith and adapted to be forced into sealing relation with said seat when pressure is generated within the vessel, said seal being made only upon movement of the major portion of said cover in an outward direction, the major central portion of said cover being formed with a plurality of closely spaced annular corrugations, whereby the central portion of the cover may readily flex from internal pressure in the vessel, a plurality of segments secured to the upper surface of the cover at the marginal edge thereof and overlying the major portion of the cover, and an integral annular cover retaining member secured to said body and having a downwardly extending annular flange initially lightly engaging the upper surfaces of said segments adjacent to the outer ends thereof, but inwardly of the seat-engaging portion of the cover, whereby said cover is held in its non-sealing relation with the seat and from disengagement with the body, said cover otherwise free to cooperate with said downwardly extending flange to provide a pronounced lever action at the marginal edge portion of said cover in a direction toward the seat as the major unsupported central portion of said cover is moved outwardly due to internal pressure generated in the vessel, whereby the marginal edge portion of the cover is forced into its sealing engagement with said seat and with varying degrees of sealing as pressure develops within the vessel.

ELMER H. SMITH.